Aug. 21, 1945.                L. W. SMITH                2,383,222
                            FLEXIBLE STAY BOLT
                            Filed Oct. 30, 1944
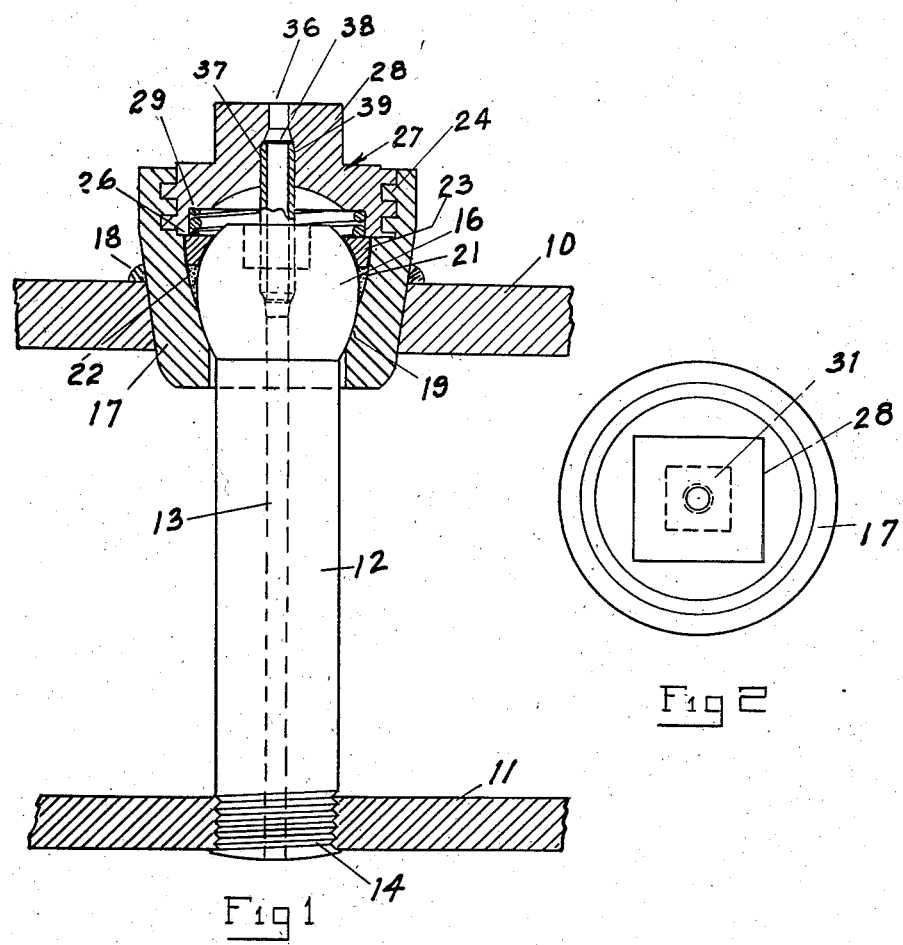
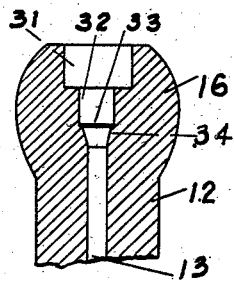
L. W. SMITH
    INVENTOR.
BY
*Henry L. Jennings*
ATTORNEY Patented Aug. 21, 1945

2,383,222

UNITED STATES PATENT OFFICE 2,383,222

FLEXIBLE STAY BOLT

Lawrence W. Smith, Birmingham, Ala.

Application October 30, 1944, Serial No. 560,991

3 Claims. (Cl. 85—1.5)

This invention relates to stay bolts for locomotive boilers and the like where the sheets to be stayed are subject to relative movement due to expansion and contraction responsive to changes in pressure and temperature, and particularly to the type of stay bolt which is flexibly connected to the outer shell of the boiler, and has for an object the provision of such a stay bolt which shall have a tell tale hole in the bolt, together with improved packing means around the head of the bolt and means affording communication between the tell tale hole and the outside atmosphere.

A further object of my invention is to provide a flexible stay bolt having a tell tale hole which shall have improved means for mounting the bolt in the boiler and improved means affording communication between the tell tale hole and the outside atmosphere.

As is well known in the art to which my invention relates, difficulties have attended the provision of tell tale holes in flexible stay bolts due to leakage between the head on the outer end of the bolt and the sleeve in which it is mounted, and the difficulty of connecting the tell tale hole with the outer atmosphere through the plug which is necessarily provided in the sleeve. In accordance with my invention, these difficulties are overcome by the provision of a packing between the spherical head of the bolt and the surrounding sleeve, which packing is spring pressed to a predetermined pressure by means of a spring coacting between a metal packing ring and the plug or cover for the sleeve. Also, in accordance with my invention, I connect the tell tale hole to the outer atmosphere by means of a flexible, relatively soft metal tube which fits in a counterbore in the stay bolt and a similar counterbore in the plug for the sleeve, which plug is screwed down tightly onto the tube to form a fluid tight fit in the plug and in the counterbore in the stay bolt.

A stay bolt constructed in accordance with my invention is illustrated in the accompanying drawing, forming a part of this application, in which Fig. 1 is a sectional elevation showing the stay bolt mounted in a boiler;

Fig. 2 is a plan view showing the sleeve and cap; and

Fig. 3 is a detail sectional view showing the manner in which the counterbore and socket in the bolt are formed.

Referring to the drawing for a better understanding of my invention, I show a fragment of a boiler having an outer sheet 10 and an inner sheet 11. My improved stay bolt is shown at 12 and has a tell tale hole 13 therein which extends through the outer end of the bolt. The inner end of the bolt 14 is threaded, as shown, and screwed into the inner sheet 11. The outer end of the bolt 12 is provided with a rounded, or spherical head 16, which is mounted in a sleeve 17, the latter being preferably welded to the outer sheet 10, as shown at 18. The sleeve 17 is provided with an inner spherical surface 19 against which the inward side of the spherical head 16 of the bolt seats, and above said surface 19, the sleeve flares outwardly as shown at 21.

Within the flaring space, I provide a packing 22 which is preferably some form of well known molded fibrous, or similar steam packing, and on top of the packing 22 I provide a metal packing ring 23. The outer end of the sleeve 17 is threaded as shown at 24. The threads on the threaded portion are preferably made relatively coarse, as shown, so as to render the cap more easily removed for periodical tests. The threaded portion 24 terminates inwardly at a shoulder 26. Screwed into the threaded portion 24 is a plug 27 which bottoms, when screwed down, against the shoulder 26. The outer end of the plug 27 is provided with a squared head 28 to receive a suitable tool for screwing the plug in. The inner side of the plug 27 is hollowed out to receive a spring 29 which fits snugly therein and which bears against the metal packing ring 23. Also, plug 27, when screwed down, bears against the outer perimeter of the metal ring 23 as shown in Fig. 1. The metal ring 23 is thus held against the steam packing ring 21 by an even spring pressure and is limited in outward movement by the plug 27. Leakage around the head 16 of the stay bolt is thus effectively prevented.

As may be seen more clearly in Fig. 3, the head 16 of the stay bolt 12 is provided with a socket 31 for the reception of a suitable wrench by which the stay bolt can be mounted in the boiler as shown in Fig. 1. In the bottom of the socket 31 is a counterbore 32 communicating with the tell tale hole 13 and terminating at 33 in a shoulder. Below the shoulder 33 is a slightly tapered portion 34 which connects directly with the tell tale hole 13. The plug 27 is also provided with a hole 36 which extends through the outer end 28 thereof and is in alignment with tell tale hole 13 in the stay bolt 12. The hole 36 is counterbored internally of the plug as shown at 37, which counterbore terminates at a shoulder 38. Fitting within the counterbores 32 and 37 so as to form a fluid tight fit with the cap and with the stay bolt is a relatively flexible tube 39. The tube 39 may be made of any relatively soft, flexible metal such as copper, brass, lead, or aluminium. I preferably make the tube 39 slightly longer, say about $\frac{1}{16}$ inch, than the distance between the shoulders 38 and 33 when the plug 27 is screwed down. Thus, when the stay bolt is being installed and the tube 39 is put in position and the plug screwed down, the inward end of the tube 39 is deformed and forced slightly inward of the tapered portion 34 to insure a fluid tight fit, and against leakage outwardly of the sleeve 17 in event any pressure should get by the packing rings 22 and 23.

From the foregoing, it will be apparent that I have devised an improved flexible stay bolt having a tell tale hole which is simple and rugged of design, easily installed, and which insures against leakage around the head of the bolt, and affords continuous communication between the tell tale hole and the atmosphere.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a flexible stay bolt having a tell tale hole extending through the outer end thereof, a sleeve surrounding the outer end of the stay bolt, and provided with a spherical seat and a wall flaring outwardly from the seat a rounded head on the stay bolt seated in the sleeve, packing in the space between the head and the flaring wall of the sleeve, a packing ring bearing on the packing, a spring bearing against the packing ring, a plug for the sleeve having a recess therein for receiving the spring and bearing against the outer perimeter of the packing ring, and a shoulder in the sleeve against which the plug bottoms.

2. In a flexible stay bolt having a tell tale hole extending through the outer end thereof, a counterbore in the outer end of the bolt in alignment with the tell tale hole and terminating in a shoulder, a sleeve surrounding the outer end of the stay bolt, a rounded head on the stay bolt seated in the sleeve, packing surrounding the head, a packing ring bearing on the packing, a spring bearing against the packing ring, a plug for the sleeve having a recess therein for receiving the spring and bearing against the outer perimeter of the packing ring, and a shoulder in the sleeve against which the plug bottoms, a counterbore in the stay bolt near the outer end in alignment with the tell tale hole and terminating in a shoulder, the plug having a hole therethrough in alignment with the tell tale hole, a counterbore in the plug terminating in a shoulder, and a flexible tube connecting the tell tale hole and the hole through the cap and seated in fluid tight relation in said counterbore.

3. A device as defined in claim 2 in which the tell tale hole in the stay bolt is flared where it connects with the counterbore to receive the inner end of the tube, and in which the tube is made of relatively soft metal to be deformed and forced into said flaring portion.

LAWRENCE W. SMITH.